(12) United States Patent
Chen et al.

(10) Patent No.: US 12,536,190 B2
(45) Date of Patent: Jan. 27, 2026

(54) METHOD AND APPARATUS FOR STORING AND PROCESSING DATA FOR LARGE MODEL

(71) Applicant: Beijing Baidu Netcom Science Technology Co., Ltd., Beijing (CN)

(72) Inventors: Weixu Chen, Beijing (CN); Li Li, Beijing (CN); Qing Ye, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/749,131

(22) Filed: Jun. 20, 2024

(65) Prior Publication Data

US 2025/0013658 A1    Jan. 9, 2025

(30) Foreign Application Priority Data

Dec. 18, 2023  (CN) .......................... 202311745724.4

(51) Int. Cl.
*G06F 16/00* (2019.01)
*G06F 16/25* (2019.01)

(52) U.S. Cl.
CPC ................. *G06F 16/254* (2019.01)

(58) Field of Classification Search
CPC ......... G06F 16/00; G06F 16/254; G06F 16/25
See application file for complete search history.

(56) References Cited

U.S. PATENT DOCUMENTS

| 2018/0024924 | A1* | 1/2018 | Winkler | G06F 12/0808 |
| | | | | 711/135 |
| 2023/0014025 | A1 | 1/2023 | Zhu | |
| 2023/0367769 | A1* | 11/2023 | Varshney | G06F 16/256 |

FOREIGN PATENT DOCUMENTS

| CN | 111611418 A | 9/2020 |
| CN | 112380227 A | 2/2021 |
| CN | 113111181 A | 7/2021 |
| CN | 114817419 A | 7/2022 |
| CN | 115686376 A | 2/2023 |

OTHER PUBLICATIONS

Chinese First Office Action dated Sep. 26, 2024 in related Chinese Application No. 202311745724.4 (seven pages).
Hongbin, Gu et al., "Research on Data Lake based university big data management system and processing mechanism" Panjin Vocational & Technical College, Panjin, Liaoning 124000, China, Computer Era No. 5, pp. 109-115 (2020).

* cited by examiner

*Primary Examiner* — Cheryl Lewis
(74) *Attorney, Agent, or Firm* — Kilpatrick Townsend & Stockton LLP (57) ABSTRACT

A method for storing data and a method for processing data, for a large model scenario, and corresponding apparatus are provided, relating to the field of artificial intelligence such as data processing, data storage, cloud platforms, cloud services, deep learning, large models, and large language models. An implementation of the method includes: in response to receiving to-be-stored data to be stored into a target data lake, detecting a data type of the to-be-stored data; in response to the data type of the to-be-stored data being an unstructured data type, generating a feature vector of the to-be-stored data; and storing the feature vector, as a substitute of the to-be-stored data, into the target data lake.

20 Claims, 7 Drawing Sheets

METHOD AND APPARATUS FOR STORING AND PROCESSING DATA FOR LARGE MODEL

CROSS-REFERENCE TO RELATED APPLICATIONS

This application claims the priority from Chinese Patent Application No. 202311745724.4, filed in the National Intellectual Property Administration (CNIPA) on Dec. 18, 2023, the contents of which are hereby incorporated by reference in their entirety.

TECHNICAL FIELD

The present disclosure relates to the field of computer technologies, in particular, to the field of artificial intelligence such as data processing, data storage, cloud platforms, cloud services, deep learning, large models, and large language models, and more particularly, to a method and apparatus for storing and processing data for large model scenarios, an electronic device, a computer readable storage medium, and a computer program product.

BACKGROUND

As society develops, the types of data are becoming richer, in which the more prominent data types includes structured data and unstructured data. In order to facilitate storage and analysis of unstructured data, such as multimedia data generated by application systems such as traffic systems and security systems, special data management devices are required to manage the data.

A data lake is a large data architecture that can be used to store and process large-scale, diverse data. Data lakes can eliminate data isolation and data fragmentation issues, making data easier to be accessed and analyzed. Unlike conventional data warehouses, data lakes do not require to predefine the data structure or data model. The data lake employs a flat data model, stores all the data in the original format, and allows the user to convert and process the data on demand as needed.

SUMMARY

Embodiments of the present disclosure provides a method and apparatus for storing and processing data for large model scenarios, an electronic device, a computer readable storage medium, and a computer program product.

According to a first aspect, embodiments of the present disclosure provide a method for storing data for a large model scenario. The method includes: in response to receiving to-be-stored data to be stored into a target data lake, detecting a data type of the to-be-stored data; in response to the data type of the to-be-stored data being an unstructured data type, generating a feature vector of the to-be-stored data; and storing the feature vector, as a substitute of the to-be-stored data, into the target data lake.

According to a second aspect, embodiments of the present disclosure provide a method for processing data for a large model scenario. The method includes: obtaining target input data in response to receiving, from a target device, a request for invoking a second data processing model to process the target input data, wherein the second data processing model is obtained by adjusting a model data source of a first data processing model from local data of the first data processing model to a target data lake, and the target data lake is obtained based on the method for storing data for the large model scenario according to the first aspect; in response to a data type of the target input data being an unstructured data type, determining whether a target feature vector corresponding to the target input data is able to be extracted from the target data lake; in response to the target feature vector corresponding to the target input data being able to be extracted from the target data lake, extracting the target feature vector from the target data lake, and using the target feature vector as an actual input to the second data processing model, to generate a target output result corresponding to the target feature vector using the second data processing model; and providing the target output result to the target device.

According to a third aspect, embodiments of the present disclosure provide an apparatus for storing data for a large model scenario. The apparatus includes: a data type detection unit, configured to: in response to receiving to-be-stored data to be stored into a target data lake, detect a data type of the to-be-stored data; a feature vector conversion unit, configured to: in response to the data type of the to-be-stored data being an unstructured data type, generate a feature vector of the to-be-stored data; and a feature vector storing unit, configured to: store the feature vector, as a substitute of the to-be-stored data, into the target data lake.

According to a fourth aspect, embodiments of the present disclosure provide an apparatus for processing data for a large model scenario. The apparatus includes: an invoking request receiving unit, configured to: obtain target input data in response to receiving, from a target device, a request for invoking a second data processing model to process the target input data, wherein the second data processing model is obtained by adjusting a model data source of a first data processing model from local data of the first data processing model to a target data lake, and the target data lake is obtained based on the apparatus for storing data according to the first aspect; a target feature vector detection unit, configured to: in response to a data type of the target input data being an unstructured data type, determine whether a target feature vector corresponding to the target input data is able to be extracted from the target data lake; a target feature vector extracting unit, configured to: in response to the target feature vector corresponding to the target input data being able to be extracted from the target data lake, extract the target feature vector from the target data lake, and use the target feature vector as an actual input to the second data processing model, to generate a target output result corresponding to the target feature vector using the second data processing model; and a target result output unit, configured to: provide the target output result to the target device.

According to a fifth aspect, embodiments of the present disclosure provide an electronic device. The electronic device includes: at least one processor; and a memory; in communication with the at least one processor; where the memory stores instructions executable by the at least one processor, the instructions, when executed by the at least one processor, cause the at least one processor to perform the method for storing data for a large model scenario according to any one of the implementations described in the first aspect and/or the method for processing data for a large model scenario according to any one of the implementations described in the second aspect.

According to a sixth aspect, embodiments of the present disclosure provide a non-transitory computer-readable storage medium. The non-transitory computer-readable storage medium stores computer instructions which, when executed by a computer, cause the computer to perform the method for storing data for a large model scenario according to any one of the implementations described in the first aspect and/or the method for processing data for a large model scenario according to any one of the implementations described in the second aspect.

According to a seventh aspect, embodiments of the present disclosure provide a computer program product. The computer program product comprises a computer program which, when executed by a processor, implements perform the method for storing data for a large model scenario according to any one of the implementations described in the first aspect and/or the method for processing data for a large model scenario according to any one of the implementations described in the second aspect.

The method and apparatus for storing and processing data for large model scenarios, electronic device, computer readable storage medium, and computer program product provided in embodiments of the present disclosure detects a data type of the to-be-stored data in response to receiving the to-be-stored data to be stored into a target data lake, generates a feature vector of the to-be-stored data if the data type of the to-be-stored data is an unstructured data type, and stores the feature vector, as a substitute of the to-be-stored data, into the target data lake.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications may be made to embodiments described herein without departing from the scope and spirit of the present disclosure. Similarly, for clearness and conciseness, descriptions of well-known functions and structures are omitted in the following description. It should be noted that embodiments in the present disclosure and features in the embodiments may be combined with each other on a non-conflict basis.

In addition, in the technical scheme involved in embodiments of the present disclosure, the acquisition, storage, use, processing, transportation, provision and disclosure of the one's personal information (such as the to-be-stored data later involved in embodiments of the present disclosure) comply with the provisions of relevant laws and regulations, and do not violate the public order and good morals.

Figure 1:
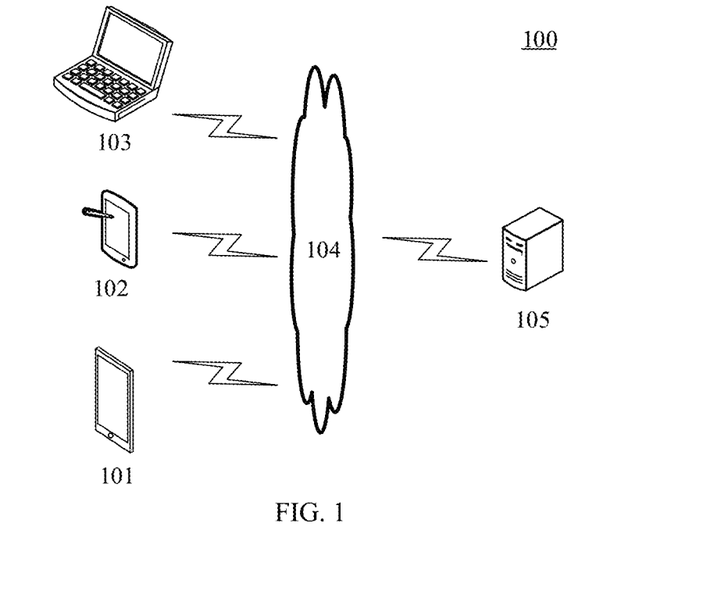
FIG. 1 is an exemplary system architecture in which embodiments of the present disclosure may be applied.

FIG. 1 illustrates an exemplary system architecture 100 to which embodiments of a method for a method and apparatus for storing and processing data for large model scenarios, an electronic device, and a computer readable storage medium according to the present disclosure may be applied.

As shown in FIG. 1, the system architecture 100 may include terminal device(s) 101, 102, 103, a network 104, and a server 105. The network 104 serves as a medium providing a communication link between the terminal device(s) 101, 102, 103 and the server 105. The network 104 may include various types of connections, such as wired or wireless communication links, or optical fiber cables.

A user may use the terminal device(s) 101, 102, 103 to interact with the server 105 through the network 104 to receive or send messages and the like. The terminal device(s) 101, 102, 103 and server 105 may be installed therein with various applications for realizing information communication between the two, such as applications for online storing, cloud service applications, and instant messaging applications.

The terminal device(s) 101, 102, 103 and the server 105 may be hardware or software. When the terminal device(s) 101, 102, 103 is hardware, it may be various electronic devices that have a display screen, including but not limited to a smart phone, a tablet computer, a laptop computer, a desktop computer, etc.; when the terminal device(s) 101, 102, 103 is software, it may be installed in the electronic device(s) listed above, and may be implemented as a plurality of software programs or software modules, or as a single software program or software module, which is not limited herein. When the server 105 is hardware, it can be realized as a distributed server cluster composed of a plurality of servers or as a single server. When the server is software, it can be realized a plurality of software or software modules, or it can be realized as a single software or software module, which is not limited herein.

The server 105 may provide various services through various built-in applications, for example, an application for online storing which may provide a data lake storage service for large model scenarios. The following effects may be realized when the server runs the application for online storing: first of all, the server 105 detects a data type of the to-be-stored data to be stored into the target data lake in response to receiving the to-be-stored data from the terminal device(s) 101, 102, 103 through the network 104; then, the server 105 generates a feature vector of the to-be-stored data in response to the data type being an unstructured data type;

finally, the server 105 stores the feature vector into the target data lake as a substitute to the to-be-stored data.

It should be noted that the to-be-stored data may be pre-stored locally on the server 105 in various ways, in addition to being obtained from the terminal device(s) 101, 102, 103 through the network 104. Therefore, when the server 105 detects that data has been stored locally (for example, a data storage task remained before starting processing), the server 105 may choose to obtain the data directly from the local.

Since the construction, maintenance and usage of a data lake and the like may require a relatively large amount of computing resources, storage resources, and a relatively large amount of computing capacity, the method for storing data and the method for processing data, targeting at large model scenarios, provided in subsequent embodiments of the present disclosure are generally executed by the server 105, which has a relatively large amount of computing capacity and a relatively large amount of computing resources. Accordingly, the apparatus for storing data for a large model scenario is also generally provided in the server 105. However, it should be noted that when the terminal device(s) 101, 102, 103 has the operation capability and the operation resources that satisfy the requirements, the terminal device(s) 101, 102, 103 may complete the above operations performed by the server 105 through the application for online storing installed therein, thereby outputting the same results as those of the server 105. In particular, in the case where a plurality of terminal devices having different computing capabilities exist at the same time, when the application for online storing determines that the terminal device, in which the application for online storing is located, has a relatively strong computing capability and a relatively large amount of remaining computing resources, the terminal device may be enabled to execute the above-mentioned operations, so that the computing pressure of the server 105 is appropriately reduced. Accordingly, the apparatus for storing data for a large model scene may be provided in the terminal device(s) 101, 102,103. For example, in some scenarios, the server 105 may be used as an execution body of the method for storing data for a large model scenario, and the terminal device(s) 101, 102, 103 may be used as an execution body of the method for processing data for a large model scenario.

It should be understood that the number of terminal devices, networks and servers in FIG. 1 is merely illustrative. There may be any number of terminal devices, networks, and servers as desired for implementation.

Figure 2:
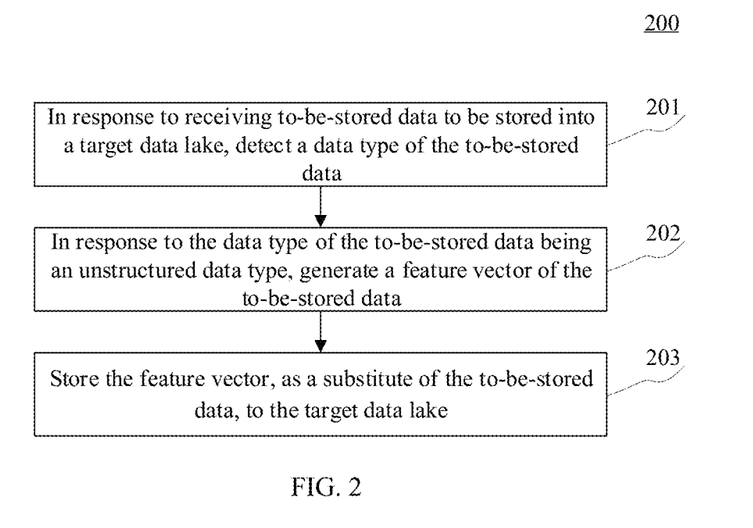
FIG. 2 is a flowchart of a method for storing data for a large model scenario according to an embodiment of the present disclosure.

FIG. 2 is a flow chart of a method for storing data for a large model scenario according to an embodiment of the present disclosure. A flow 200 includes the following steps.

At step 201, the flow 200 includes in response to receiving to-be-stored data to be stored into a target data lake, detecting a data type of the to-be-stored data.

This step is intended to detect the data type of the to-be-stored data, in response to receiving the to-be-stored data to be stored in the target data lake by an execution body (for example, the server 105 shown in FIG. 1) of the method for storing data for the large model scene. The data type of the to-be-stored data may be, for example, structured data, unstructured data, or the like.

Structured data, also referred to as row data, is data that is logically expressed and implemented by a two-dimensional table structure, strictly complies with data format and length specifications, and is stored and managed primarily through relational databases. In contrast to structured data is unstructured data that is not suitable for being represented by a database two-dimensional table. Unstructured data is data that is irregular or incomplete in data structure, has no predefined data model, and is inconvenient to be represented in a database two-dimensional logical table. The unstructured data may include office documents, XML, HTML, various reports, pictures and audios, video information, and the like in various formats.

It should be noted that the to-be-stored data may be directly acquired by the above-mentioned execution body from a local storage device, or may be acquired from a non-local storage device such as the terminal device(s) 101, 102, 103 shown in FIG. 1. The local storage device may be a data storage module, such as a server hard disk, provided in the above-mentioned execution body, in which case the to-be-stored data may be quickly read locally. The non-local storage device may also be any other electronic device provided for storing data, such as user terminals or the like, in which case the above-mentioned execution body may acquire the desired to-be-stored data by sending an acquisition command to the electronic device.

At step 202, the flow 200 includes in response to the data type of the to-be-stored data being an unstructured data type, generating a feature vector of the to-be-stored data.

On the basis of the above step 201, the present step is intended to process the to-be-stored data and generate a feature vector of the to-be-stored data by the execution body, in response to determining that the data type of the to-be-stored data is an unstructured data type (unstructured data for short).

For example, the execution body may process the to-be-stored data to obtain a feature vector based on the feature engineering (embedding). In some embodiments, the execution body may process the to-be-stored data to obtain a feature vector by invoking a data processing model. It should be understood that the corresponding data processing model may generally be configured according to a specific type (e.g., text, picture, etc.) of the unstructured data, to process the unstructured data and generate a feature vector. For example, in the case where the to-be-stored data is unstructured data in the form of text, the execution body may process the to-be-stored data to obtain a corresponding feature vector (e.g., a word feature vector, a semantic feature vector, or the like) by, for example, a word vector model. Similarly, in the case where the to-be-stored data is unstructured data in the form of a picture, the execution body may process the to-be-stored data to obtain a corresponding feature vector (e.g., a graphical semantic feature vector) by an image feature extraction model.

In some alternative implementations of the present embodiment, if the execution body determines that the to-be-stored data is not unstructured data, for example, the to-be-stored data is structured data, the execution body may directly store it into the target data lake without processing it to obtain a feature vector.

At step 203, the flow 200 includes storing the feature vector, as a substitute of the to-be-stored data, to the target data lake.

On the basis of the above step 202, this step is intended to store, by the above execution body, the feature vector into the target data lake, using the feature vector generated in step 202 as a substitute of the to-be-stored data. For example, after the execution body acquires a location (or storage space) intended for storing the to-be-stored data, the execution body may store the feature vector into the location, rather than store the to-be-stored data into the location, so that the feature vector may be used as a substitute of the to-be-stored data. In some alternative implementations of the present embodiment, the execution body may maintain the access path, the access identification, the keyword information, and the like originally used for the to-be-stored data, so that the feature vector, as a substitute, may be called based on the original calling method for calling the to-be-stored data. Thus, when another device desires to call and use the unstructured data, it is possible for the data lake to provide the feature vector to this another device, using the feature vector corresponding to the unstructured data as a substitute.

According to the method for storing data for a large model scenario, during storing data into a data lake, unstructured data is converted into a feature vector for storage, so that the data lake may, by using the form of the feature vector, provide "unstructured data" which can be directly used for model reasoning and training support, by which means the data supporting ability of the data lake is improved, and application scenarios are expanded.

In some scenarios, the execution body may continuously receive a plurality pieces of to-be-stored data, or the execution body may be allowed to continuously receive a plurality pieces of to-be-stored data, but the execution body may not have the ability to simultaneously process and store the plurality pieces of to-be-stored data into the target data lake. Alternatively, the ability of the execution body to simultaneously process and store these plurality pieces of to-be-stored data into the target data lake is undesirable in view of the resource allocation cost and the like. In this case, the execution body may sequentially process the plurality pieces of to-be-stored data by means of a data processing queue. That is, the execution body may store the to-be-stored data into a data processing queue, and sequentially execute the processing tasks for the plurality pieces of to-be-stored data based on the order indicated by the data processing queue, so that the plurality pieces of the to-be-stored data may be processed continuously, stably, and in an orderly manner, to ensure system stability while reducing the allocation requirements of the execution body for the computational resources. For example, even if the execution body is capable of executing only one piece of to-be-stored data each time, or is capable of simultaneously processing only another fixed amount of to-be-stored data (the fixed amount is smaller than the amount of the plurality pieces of to-be-stored data that has been received), processing of the plurality pieces of to-be-stored data still can be completed by means of multiple rounds of processing.

In some embodiments, when the execution body receives the to-be-stored data, the execution body may also process only the "incremental" to-be-stored data by means to "duplicate checking and duplicate removing", or in other words, stores only the incremental to-be-stored data into the data processing queue, so as to avoid computing resource waste caused by repeated execution of identical tasks.

Figure 3:
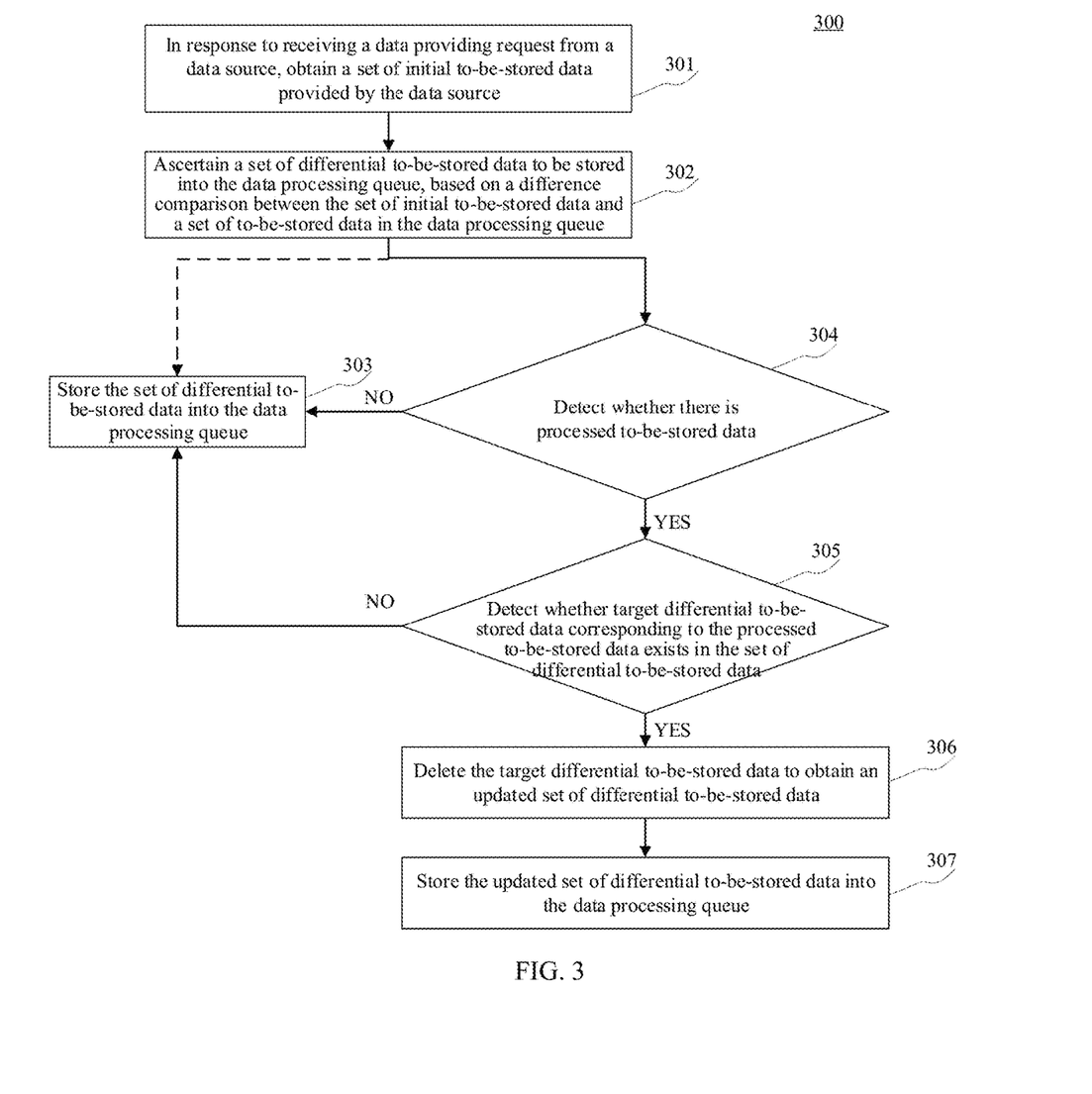
FIG. 3 is a flowchart of a flow of constructing a data processing queue according to an embodiment of the present disclosure.

For ease of understanding, reference may be made to FIG. 3. FIG. 3 is a flowchart of a flow of constructing a data processing queue according to an embodiment of the present disclosure, wherein flow 300 specifically includes the following operations.

At step 301, the flow 300 includes in response to receiving a data providing request from a data source, obtaining a set of initial to-be-stored data provided by the data source.

Particularly, the execution body obtains a set of initial to-be-stored data provided by the data source in response to receiving the data providing request from the data source. The data source may be pre-configured, and may have the right to store to-be-stored data into the target data lake.

At step 302, the flow 300 includes ascertaining a set of differential to-be-stored data to be stored into the data processing queue, based on a difference comparison between the set of initial to-be-stored data and a set of to-be-stored data in the data processing queue.

Particularly, after obtaining a set of initial to-be-stored data based on the above-mentioned step 301, the execution body may compare the difference between the set of initial to-be-stored data and the set of to-be-stored data in the data processing queue, to determine the initial to-be-stored data that exists in the set of initial to-be-stored data but absent in the set of to-be-stored data in the data processing queue. In brief, by comparing the difference between the initial to-be-stored data and the set of to-be-stored data in the data processing queue, the execution body may ascertain the initial to-be-stored data which is to be used as an increment, thereby obtaining a set of differential to-be-stored data. The differential to-be-stored data in the set of differential to-be-stored data is actually the initial to-be-stored data which exists in the set of initial to-be-stored data but absent in the set of to-be-stored data in the data processing queue.

At step 303, the flow 300 includes storing the set of differential to-be-stored data into the data processing queue.

Particularly, the execution body may store the set of differential to-be-stored data into the data processing queue to wait for processing.

Generally, by storing the set of differential to-be-stored data succeeding the to-be-processed data which is the last in the data processing queue, the execution body adds new "task to be processed" in the data processing queue.

It should be understood that, the flow 300 may be performed prior to the step 201 such as shown in FIG. 2, to construct a data processing queue for providing, transmitting, and storing data. Accordingly, the execution body may provide the to-be-stored data by controlling the transmission timing of the data processing queue, or initiating the above-described flow 200.

Alternatively or additionally, in the process of executing the flow 200, the execution body may also execute the flow 300 in parallel to update the contents in the data processing queue, so that the flow 200 may be executed in a continuous, multi-stage manner to process a plurality pieces of to-be-stored data.

In some alternative implementations of the present embodiment, to avoid that the differential to-be-stored data is erroneously judged due to the erasing of the to-be-stored data in the data processing queue after the execution body has completed the processing of the to-be-stored data in the data processing queue, the execution body may also respond if there is processed to-be-stored data, and detect whether, in the set of differential to-be-stored data, there is target differential to-be-stored data corresponding to the processed data. The processed to-be-stored data includes historical to-be-stored data that a corresponding feature vector thereof has been generated, i.e., the processed to-be-stored data may be the to-be-stored data in the data processing queue that the processing thereof has been completed.

For ease of understanding, reference may continue to be made to FIG. 3. For example, steps 304 to 307 may also be included in flow 300 between step 302 and step 303.

At step 304, the flow 300 includes detecting whether there is processed to-be-stored data.

Particularly, the execution body may detect whether the processed to-be-stored data described above exists, and if the execution body detects that the processed to-be-stored data exists, the execution body may perform step 305, otherwise, the execution body may continue to perform step 303.

At step 305, the flow 300 includes detecting whether target differential to-be-stored data corresponding to the processed to-be-stored data exists in the set of differential to-be-stored data.

If the execution body detects existence of the target differential to-be-stored data corresponding to the processed to-be-stored data in the set of differential to-be-stored data, the execution body may perform step 306, otherwise, the execution body may continue to perform step 303.

At step 306, the flow 300 includes deleting the target differential to-be-stored data to obtain an updated set of differential to-be-stored data.

At step 307, the flow 300 includes storing the updated set of differential to-be-stored data into the data processing queue.

As a result, when the to-be-stored data has been processed, the execution body may perform screening again, so as to avoid misjudgment of the differential to-be-stored data caused by the erasing of the to-be-stored data in the data processing queue after the execution body has completed the processing of the to-be-stored data in the data processing queue.

On the basis of any of the embodiments described above, in some embodiments of the present disclosure, the to-be-stored data may also be processed by introducing a data processing model to generate a feature vector of the to-be-stored data. For ease of understanding, a data processing model for generating a feature vector may be described as a first data processing model. In general, the first data processing model may be trained with data in a local database associated therewith, and upon completion of the training, reasoning may be performed with data in the local database. In some alternative implementations of the present embodiment, the first data processing model is configured based on a generative language model.

Generative Language Model (GLM) belongs to one of the Large Language Model (LLM), which may also be referred to as a large language model, which is an artificial intelligence model intended to understand and generate a human language. The generative language model may correspondingly execute a processing operation based on the content it understands to obtain a corresponding processing result. For example, upon receiving the to-be-stored data of unstructured data type, after understanding the indication, the generative language model may understand the specific meaning of "converting the to-be-stored data into a feature vector", and perform an operation of "converting the to-be-stored data into a feature vector", LLM is characterized by a large scale, which can typically include a large number of parameters to help them learn complex patterns in language data. These models are typically based on deep learning architectures, such as transformers, which help them provide better processing performance on various NLP tasks. In embodiments of the present disclosure, the execution body may also select to acquire the generative language model. The generative language model is at least configured to process to-be-stored data of unstructured data type to obtain a feature vector. For example, the generative language model may be pre-trained to have the ability to generate a feature vector for to-be-stored data of unstructured data type. In this case, the execution body may instruct the generative language model to generate a feature vector for the to-be-stored data of the unstructured data type based on a pre-configured guide word, guide tag, or the like. For example, the guide word may be "please generate a feature vector for the to-be-stored data of the unstructured data type". In some scenarios, in order to improve the generation efficiency and the generation quality, it is also possible to simultaneously inputting auxiliary guide words such as "the feature vector should be in the form of XX" to more precisely guide the generative language model, which is convenient for the generative language model to obtain the desired output content.

Similarly, for a generative language model, it may be configured by default to omit the "guide words". For example, for the purpose of generating a feature vector for the to-be-stored data of the unstructured data type, the generative language model may properly understand, based on the default configuration, the needs to generate the feature vector of the to-be-stored data of the unstructured data type. Thus, by default configuration, the generative language model may stably and directionally process the to-be-stored data of the unstructured data type to generate a corresponding feature vector. Thus, the feature vector of the to-be-stored data of the unstructured data type can be generated more efficiently and qualitatively by the generative language model.

As described above, since unstructured data cannot be directly used by, for example, a data processing model or a data analysis model, the data lake cannot directly support the data processing model or the data analysis model. However, based on the method of storing data provided in embodiments of the present disclosure, the feature vector is used as a substitute of to-be-stored data, so that the data lake is capable of directly providing support for a data processing model and a data analysis model, thereby not only improving a data support capability of the data lake, but also expanding application scenarios of the data lake. Particularly, the target data lake, obtained by substituting the to-be-stored data of the unstructured data type with the feature vector provided in embodiments of the present disclosure, may be directly used as a data source of the online model, to provide data support for the online model.

For example, the execution body may provide a second data processing model on-line to provide services for users. The second data processing model is obtained by adjusting the model data source of the first data processing model from the local data of the first data processing model to the target data lake. That is, the second data processing model may utilize the target data lake as a data support source, so as to be used by the target devices (e.g., the terminal device(s) 101, 102, 103) used by the users.

Accordingly, in some scenarios, the execution body may also utilize the target data lake to support other model data provided by the user. For example, when the feature vectors stored in the target data lake could be identified and used by other models provided by the user, the user may, by connecting the target data lake to the other models, use the data stored in the data lake to provide support for the other models which is desired to be used.

Figure 4:
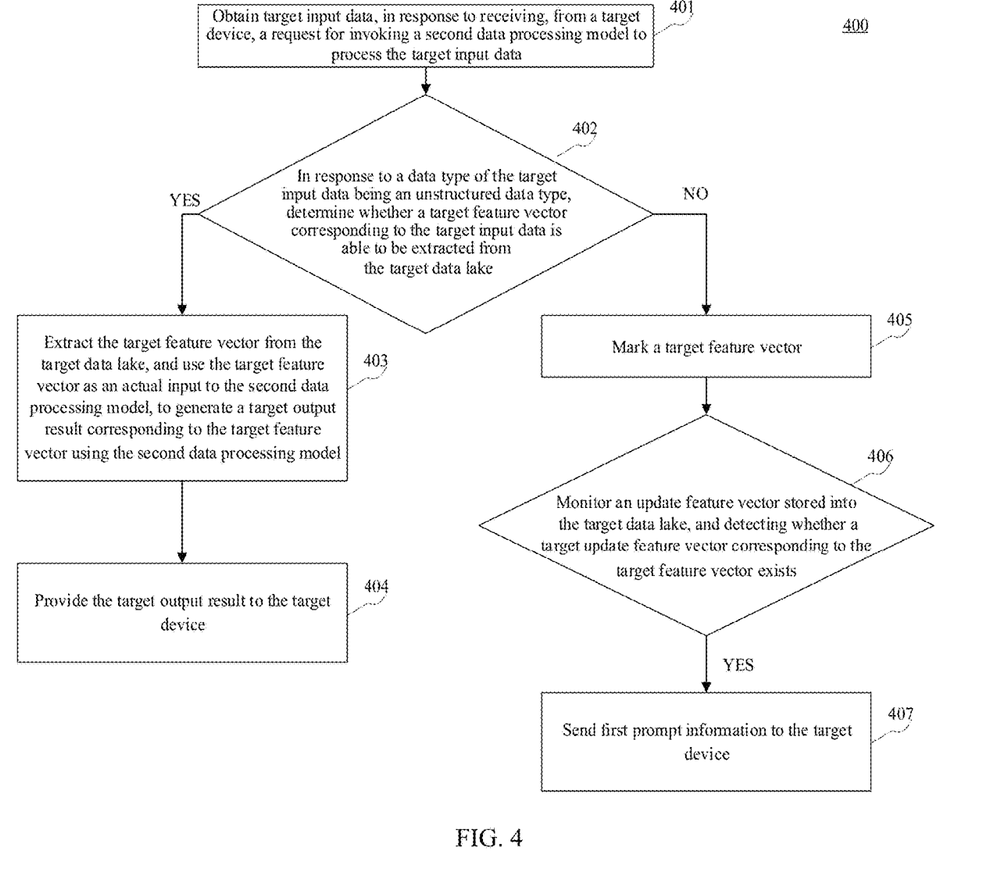
FIG. 4 is a flowchart of a method for processing data for a large model scenario according to an embodiment of the present disclosure.

For ease of understanding, reference may be made to FIG. 4. FIG. 4 is a flowchart of a method of processing data for a large model scenario according to an embodiment of the present disclosure, wherein the flow 400 includes following steps.

At step 401, the flow 400 includes obtaining target input data, in response to receiving, from a target device, a request for invoking a second data processing model to process the target input data.

This step is intended to respond to a request for invoking the second data processing model to process the target input data when the execution body receives the request for invoking the second data processing model from the target device, to obtain the target input data. For example, the target input data may be a to-be-processed text, a to-be-processed image, or the like entered by a user. As explained above, the second data processing model may be a data processing model obtained by adjusting the model data source of the first data processing model from the local data of the first data processing model to the target data lake. Accordingly, the second data processing model, compared to the first data processing model, may utilize, for example, the target data lake obtained in the embodiment shown in FIG. 2 described above as a data source, to obtain data support for model reasoning, training.

At step 402, the flow 400 includes in response to a data type of the target input data being an unstructured data type, determining whether a target feature vector corresponding to the target input data is able to be extracted from the target data lake.

This step is intended to, when the execution body determines that the data type of the target input data is the unstructured data type, that is, when the target input data cannot be directly used by the second data processing model, determine whether or not the target feature vector corresponding to the target input data is able to be extracted from the target data lake, and use the feature vector as a substitute of the unstructured data type provided by the user.

In practice, the target feature vector corresponding to the target input data may be a feature vector obtained by processing the target input data, or may be support data required for processing the target feature vector to obtain the feature vector (for example, the support data may be a feature vector used as a sample or the like).

If the execution body is capable of extracting the target feature vector corresponding to the target input data from the target data lake to use the same as a substitute of the unstructured data, step 403 is performed.

It should be understood that, similar to storing content into the target data lake, the execution body may also provide the target input data directly from the target data lake to the second data processing model for processing if the data type of the target input data is not an unstructured data type, and the description will not be repeated here.

At step 403, the flow 400 includes extracting the target feature vector from the target data lake, and using the target feature vector as an actual input to the second data processing model, to generate a target output result corresponding to the target feature vector using the second data processing model.

Based on the above-mentioned step 402, if the execution body determines that the target feature vector is able to be provided by the target data lake, the execution body may extract the target feature vector from the target data lake, and input the target feature vector to the second data processing model to generate a target output result corresponding to the target feature vector using the second data processing model.

At step 404, the flow 400 includes providing the target output result to the target device.

This step is intended to provide, by the execution body, the output target output result to the target device on the basis of the above-mentioned step 403, to complete the data processing flow.

The method for processing data for a large model scenario provided by embodiments of the present disclosure may use a target data lake, in which unstructured data is stored in the form of a feature vector, as a data source of a data processing model, thereby simplifying configuration requirements of the data processing model and improving processing capability of the data processing model.

In some alternative implementations of the present embodiment, step 405 may also be included in flow 400 in response to failing to extract the target feature vector corresponding to the target input data from the target data lake. Step 405 may be performed in a case where it is determined that the target feature vector corresponding to the target input data cannot be extracted from the target data lake as a substitute of the unstructured data, after the execution body executes step 402.

At step 405, the flow 400 includes marking a target feature vector.

Particularly, the execution body may mark the desired target feature vector. For example, the execution body may maintain description information of the target feature vector as a mark.

At step 406, the flow 400 includes monitoring an update feature vector stored into the target data lake, and detecting whether a target update feature vector corresponding to the target feature vector exists.

Particularly, on the basis of the above-mentioned step 405, the execution body may continuously monitor the content of the updated feature vectors stored into the target data lake, and detect whether a target updated feature vector is included or present in the updated feature vectors. That is, the execution body may continuously detect whether or not the desired target update feature vector has been updated and stored into the target data lake.

Further, if the execution body detects that the desired target update feature vector has been updated and stored into the target data lake, step 407 may be selected and executed.

At step 407, the flow 400 includes sending first prompt information to the target device.

Particularly, after the execution subject detects that the desired target feature vector has been updated and stored into the target data lake (that is, the target feature vector is updated to the target data lake by adding the target update feature vector to the data lake), the execution body may be prompted by the first prompt information that the support capability of the target data lake is already available (that is, the target data lake can be provided). Alternatively, the first prompt information may indicate that the target device is allowed to process the target input data using the data processing model. Accordingly, the user of the target device may select whether it is necessary to re-issue a request to use the target feature vector based on its needs. Thus, by such an event notification mechanism, it is possible to send a notification message after the upstream stores the to-be-stored data into the target data lake, so that the downstream is capable of timely consuming the notification message and processing the incremental data. In this manner, the upstream and downstream are decoupled, and incremental data may be processed in a streaming manner.

In some alternative implementations of the present embodiment, as described above, in the case where the to-be-processed data is provided by means of the data processing queue, the execution body may also send second prompt information to the target device in response to the absence of the target to-be-stored data associated with the target input data in the data processing queue, where the second prompt information indicates that the target device is not allowed to process the target input data using the second data processing model.

Particularly, if data processing queue is used to provide the to-be-processed data, in the case where the target feature vector does not exist in the target data lake, the execution body may determine whether "target feature vector" will be added into the target data lake by checking the to-beprocessed data in the data processing queue. If the execution body determines that the data processing queue lacks the to-be-processed data which is used for adding the "target feature vector", it may send the second prompt information to the target device. The second prompt information may indicate that the target device is not allowed to process the target input data using the second data processing model. As a result, when the target data lake lacks the supporting capability, the target device is rejected from invoking the second data model supported by the target data lake, so that feeding back to the user and mistakenly waiting for a response by the user may be avoided while processing errors are avoided.

Further, in some alternative implementations of the present embodiment, in the case where data processing queue is used for providing to-be-stored data, if the execution body determines that the target to-be-stored data associated with the target input data exists in the data processing queue, the execution body may also choose to adjust the data output priority of the target to-be-stored data in the data processing queue to the target priority. For example, priority levels 1, 2, and 3 are configured based on a pre-processing priority rule, and the processing order may be priority level 1>priority level 2>priority level 3. The execution body may determine priority level 1 as the target priority to adjust the processing priority of the target to-be-stored data, so that the target to-be-stored data may be processed as soon as possible. Thus, the to-be-stored data associated with the target input data may be preferentially processed to reduce the waiting time on the user side.

In some embodiments, the execution body may also choose to directly adjust the sequence of the target to-be-stored data in the data processing queue for similar purposes. For example, the execution body may adjust the processing of the target to-be-stored data to the Xth position in order to accelerate the processing thereof. Illustratively, the execution body may adjust the position of the target to-be-stored data in the sequence of the data processing queue to a "next" position which will be processed immediately after completion of the current processing, so that the target to-be-stored data may be processed immediately after completion of the processing of the current to-be-processed data, thereby reducing the waiting time on the user side.

Figure 5:
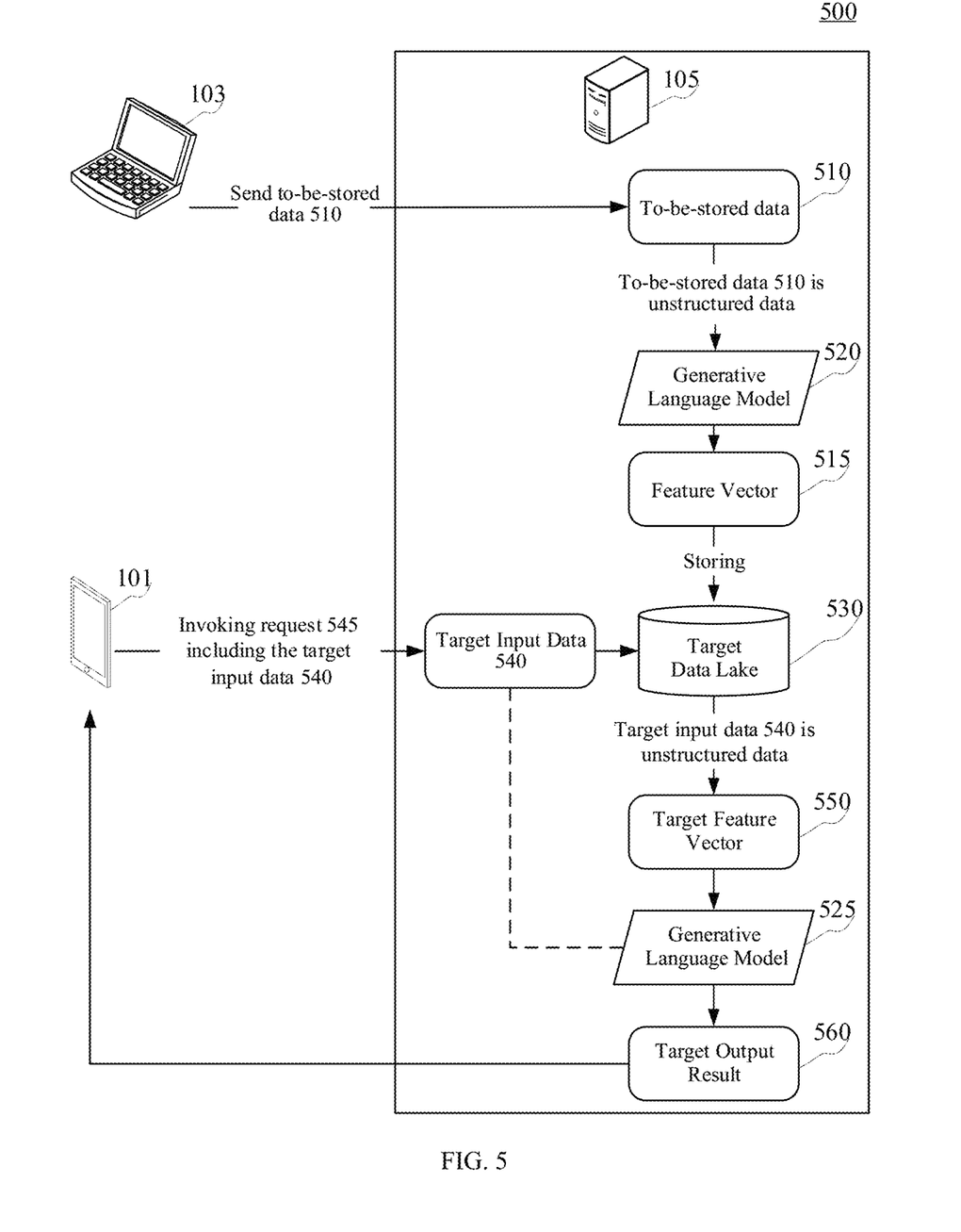
FIG. 5 is a schematic flow diagram combining a method for storing data and a method for processing data for a large model-oriented scenario in an application scenario according to an embodiment of the present disclosure.

For further understanding, in conjunction with a specific application scenario, an embodiment of the present disclosure also provides a specific implementation, referring the flow 500 shown in FIG. 5. The flow 500 may include two processes, storing data and processing data for large model scenarios, as described above. For example, the server 105 may be served as the execution body for storing data and processing data, the to-be-stored data (e.g., to-be-stored data 510) to be stored to a data lake (e.g., target data lake 530) may be provided to the server 105 by the terminal device 103. The terminal device 101 may invoke the generative language model 525 to process the target input data (e.g., target input data 540).

As will be explained in detail below, the detailed scheme is as follows.

The server 105 may detect the data type of the to-be-stored data 510 in response to receiving the to-be-stored data 510 from the terminal device 103 to be stored into the target data lake 530.

In response to determining that the data type of the to-be-stored data 510 is an unstructured data type, the server 105 processes the to-be-stored data 510 using the generative language model 520 to generate the feature vector 515 of the to-be-stored data 510.

Further, the server 105 may store the feature vector 515 into the target data lake 530 as a substitute of the to-be-stored data 510.

Next, in the case where the terminal device 101 desires to invoke the generative language model 525 to process the target input data 540, it may send an invoking request 545 including the target input data 540 to the server 105. The generative language model 525 is obtained by adjusting the model data source of the generative language model 520 from the local data of the generative language model 520 to the target data lake 530.

The server 105 obtains the target input data 540, in response to receiving from the terminal device 101 the invoking request 545 for processing the target input data 540 by the invoking the generative language model 525.

Next, the server 105 determines whether the target feature vector 550 corresponding to the target input data 540 is able to be be extracted from the target data lake 530, in response to the data type of the target input data 540 being an unstructured data type.

For ease of understanding, illustratively in flow 500, the server 105 is able to extract target feature vector 550 corresponding to target input data 540 from target data lake 530.

Next, the server 105 may use the target feature vector 550 as an actual input of the generative language model 525, and generate the target output result 560 corresponding to the target feature vector 550 by using the generative language model 525.

Finally, the server 105 may provide the target output result 560 to the terminal device 101, so as to use the target data lake 530 as a model data source of the generative language model 525, and provide a data processing service based on the generative language model 525 for the user (or in other words, the terminal device 101).

Figure 6:
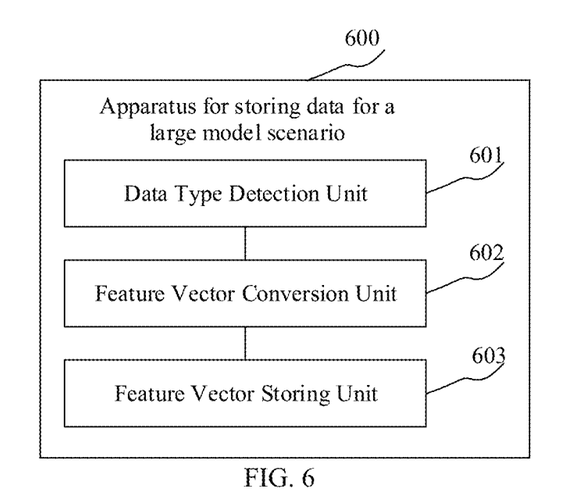
FIG. 6 is a structural block diagram of an apparatus for storing data for a large model scenario according to an embodiment of the present disclosure.

With further reference to FIG. 6, as an implementation of the method shown in each of the above figures, an embodiment of the present disclosure provides an apparatus for storing data for a large model scenario, which corresponds to the method embodiment shown in FIG. 2, and which is particularly applicable to various electronic devices.

As illustrated in FIG. 6, the apparatus 600 for storing data for a large model scenario according to an embodiment may include a data type detection unit 601, a feature vector conversion unit 602, and a feature vector storing unit 603. The data type detection unit 601 is configured to: in response to receiving to-be-stored data to be stored into a target data lake, detect a data type of the to-be-stored data. The feature vector conversion unit 602 is configured to: in response to the data type of the to-be-stored data being an unstructured data type, generate a feature vector of the to-be-stored data; The feature vector storing unit 603 is configured to: store the feature vector, as a substitute of the to-be-stored data, into the target data lake.

In the present embodiment, the detailed processing of the data type detection unit 601, the feature vector conversion unit 602, and the feature vector storing unit 603, and the technical effects thereof, in the apparatus 600 for storing data for a large model scenario, may be described with reference to the related description of steps 201-203 in the corresponding embodiment described in FIG. 2, and details are not described herein.

In some alternative implementations of the present embodiment, in response to successively receiving a plurality pieces of to-be-stored data, the plurality pieces of to-be-stored data are sequentially processed based on a data processing queue, the apparatus further comprises: an initial data acquisition unit, configured to: in response to receiving a data providing request from a data source, obtain a set of initial to-be-stored data provided by the data source; a data difference comparison unit, configured to: ascertain a set of differential to-be-stored data to be stored into the data processing queue, based on a difference comparison between the set of initial to-be-stored data and a set of to-be-stored data in the data processing queue, wherein differential to-be-stored data in the set of differential to-be-stored data comprises initial to-be-stored data existing in the set of initial to-be-stored data and absent in the set of to-be-stored data in the data processing queue; and a differential data storing unit, configured to store the set of differential to-be-stored data into the data processing queue.

In some alternative implementations of the present embodiment, the apparatus 600 further includes: a duplicate data detection unit, configured to: in response to existence of to-be-stored data that has been processed, detect whether target differential to-be-stored data corresponding to the to-be-stored data that has been processed exists in the set of differential to-be-stored data, where the to-be-stored data that has been processed includes historical to-be-stored data of which a feature vector has been generated; a differential data updating unit, configured to: in response to existence of the target differential to-be-stored data in the set of differential to-be-stored data, delete the target differential to-be-stored data to obtain an updated set of differential to-be-stored data; and the differential data storing unit is further configured to store the updated set of differential to-be-stored data into the data processing queue.

In some alternative implementations of the present embodiment, the feature vector conversion unit 602 is further configured to: in response to the data type of the to-be-stored data being the unstructured data type, process the to-be-stored data using a first data processing model, to generate the feature vector of the to-be-stored data.

Figure 7:
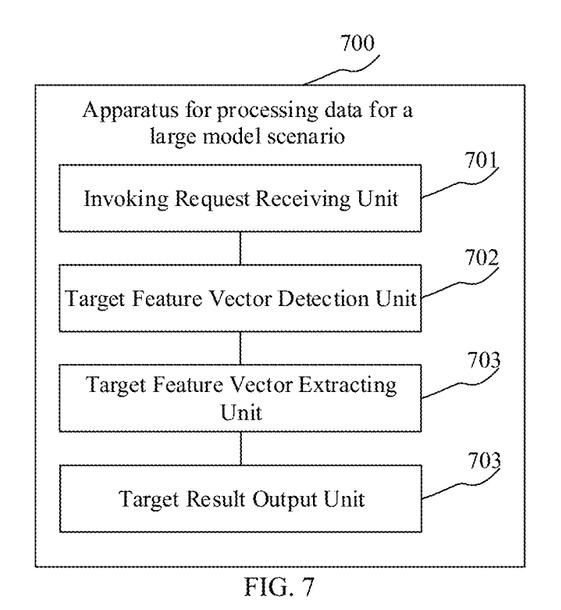
FIG. 7 is a structural block diagram of an apparatus for processing data for a large model scene according to an embodiment of the present disclosure.

With further reference to FIG. 7, as an implementation of the method shown in each of the above figures, an embodiment of the present disclosure provides an apparatus for processing data, which corresponds to the method embodiment shown in FIG. 4 and which is particularly applicable to various electronic devices.

As illustrated in FIG. 7, the apparatus 700 for processing data for a large model scenario according to the present embodiment may include an invoking request receiving unit 701, a target feature vector detection unit 702, a target feature vector extracting unit 703, and a target result output unit 704. The invoking request receiving unit 701 is configured to: obtain target input data in response to receiving, from a target device, a request for invoking a second data processing model to process the target input data, wherein the second data processing model is obtained by adjusting a model data source of a first data processing model from local data of the first data processing model to a target data lake, and the target data lake is obtained based on the apparatus for storing data according to the apparatus 600 for storing data as illustrated in FIG. 6. The target feature vector detection unit 702 is configured to: in response to a data type of the target input data being an unstructured data type, determine whether a target feature vector corresponding to the target input data is able to be extracted from the target data lake. The target feature vector extracting unit 703 is configured to: in response to the target feature vector corresponding to the target input data being able to be extracted from the target data lake, extract the target feature vector from the target data lake, and use the target feature vector as an actual input to the second data processing model, to generate a target output result corresponding to the target feature vector using the second data processing model. The target result output unit 704 is configured to: provide the target output result to the target device.

In the present embodiment, the detailed processing of the invoking request receiving unit 701, target feature vector detection unit 702, target feature vector extracting unit 703, and target result output unit 704, and the technical effects thereof, in the apparatus 700 for processing data for a large model scenario, may be described with reference to the related description of steps 401-403 in the corresponding embodiment described in FIG. 4, and details are not described herein.

In some alternative implementations of the present embodiment, the apparatus 700 further includes: an invoking request receiving unit, configured to: obtain target input data in response to receiving, from a target device, a request for invoking a second data processing model to process the target input data, wherein the second data processing model is obtained by adjusting a model data source of a first data processing model from local data of the first data processing 30) model to a target data lake; a target feature vector detection unit, configured to: in response to a data type of the target input data being an unstructured data type, determine whether a target feature vector corresponding to the target input data is able to be extracted from the target data lake; a target feature vector extracting unit, configured to: in response to the target feature vector corresponding to the target input data being able to be extracted from the target data lake, extract the target feature vector from the target data lake, and use the target feature vector as an actual input to the second data processing model, to generate a target output result corresponding to the target feature vector using the second data processing model and a target result output unit, configured to: provide the target output result to the target device.

In some alternative implementations of the present embodiment, in response to failing to extract the target feature vector corresponding to the target input data from the target data lake, the apparatus 700 further comprises: a target feature vector marking unit, configured to mark the target feature vector; a data lake update monitoring unit, configured to: monitor an update feature vector stored into the target data lake, and detect whether a target update feature vector corresponding to the target feature vector exists; and a first prompt information sending unit, configured to: in response to existence of the target update feature vector corresponding to the target feature vector, send first prompt information to the target device, wherein the first prompt information indicates that the target device is allowed to process the target input data using the second data processing model.

In some alternative implementations of the present embodiment, in response to successively receiving a plurality pieces of to-be-stored data, the plurality pieces of to-be-stored data are sequentially processed based on a data processing queue, the apparatus 700 further comprises: a queue processing order adjusting unit, configured to: in response to existence of target to-be-stored data associated with the target input data in the data processing queue, adjust a data output priority of the target to-be-stored data in the data processing queue to a target priority.

In some alternative implementations of the present embodiment, the apparatus 700 further includes: a second prompt information sending unit, configured to: in response to absence of the target to-be-stored data associated with the target input data in the data processing queue, send second prompt information to the target device, wherein the second prompt information indicates that the target device is not allowed to process the target input data using the second data processing model.

The present embodiment exists as an apparatus embodiment corresponding to the above method embodiments. The apparatus for processing data for large model scenario provided by the present embodiment is able to use the target data lake, which stores unstructured data in the form of feature vector, as the data source of the data processing model, which simplifies the configuration requirements of the data processing model and improves the processing capability of the data processing model.

According to embodiments of the present disclosure, an electronic device, a readable storage medium, and a computer program product are provided.

Figure 8:
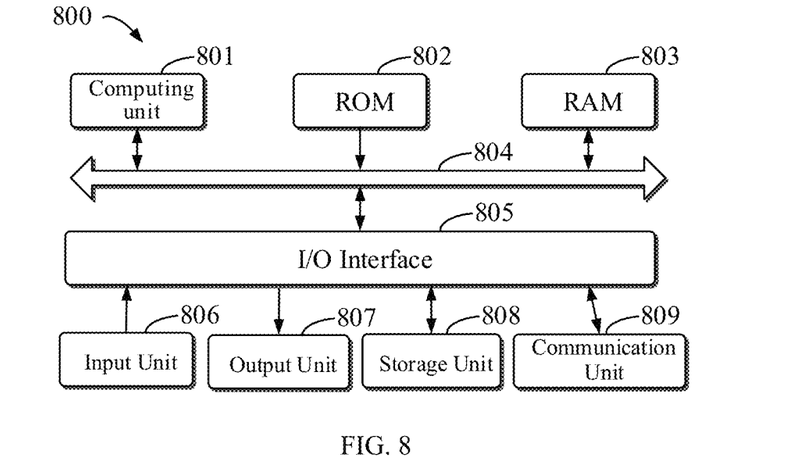
FIG. 8 is a schematic structural diagram of an electronic device suitable for performing a method for storing data for a large model scene and/or a method for processing data for a large model scene according to an embodiment of the present disclosure.

FIG. 8 is a schematic block diagram of an example electronic device 800 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit the implementations of the present disclosure described and/or claimed herein.

As shown in FIG. 8, the device 800 includes a computing unit 801, which may execute various appropriate actions and processes in accordance with a program stored in a read-only memory (ROM) 802 or a program loaded into a random access memory (RAM) 803 from a storage unit 808. The RAM 803 also stores various programs and data required by operations of the device 800. The computing unit 801, the ROM 802 and the RAM 803 are connected to each other through a bus 804. An input/output (I/O) interface 805 is also connected to the bus 804.

A plurality of components in device 800 are connected to I/O interface 805, including an input unit 806, such as a keyboard, mouse, etc.; an output unit 807, such as various types of displays, speakers, etc.; a storage unit 808, such as magnetic disks, optical disks, etc.; and communication units 809, such as network cards, modems, wireless communication transceivers, etc. The communication unit 809 allows device 800 to exchange information/data with other devices through computer networks such as the Internet and/or various telecommunications networks.

The computing unit 801 may be various general-purpose and/or special-purpose processing assemblies having processing and computing capabilities. Some examples of the computing unit 801 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computing unit 801 performs the various methods and processes described above, for example, the method for storing data and/or the method for processing data for large model scenario. For example, in some embodiments, the method for storing data and/or the method for processing data for large model scenario may be implemented as a computer software program, which is tangibly included in a machine readable medium, for example, the storage unit 808. In some embodiments, part or all of the computer program may be loaded into and/or installed on the device 800 via the ROM 802 and/or the communication unit 809. When the computer program is loaded into the RAM 803 and executed by the computing unit 801, one or more operations of the above method for storing data and/or the method for processing data for large model scenario may be performed. Alternatively, in other embodiments, the computing unit 801 may be configured to perform the method for storing data and/or the method for processing data for large model scenario through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed 30) entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection 10) based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein May be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual 20) feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a 30) communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The Server could be a cloud server, also known as cloud computing server or cloud host, which is a host product in the cloud computing service system to solve the defects of difficult management and weak business scalability in the traditional physical host and Virtual Private server (VPS, Virtual Private Server) service. The server may also be classified as distributed system servers, or a server that combines a blockchain.

According to the technical solution described in embodiments of the present disclosure, during storing data into a data lake, unstructured data is converted into a feature vector for storage, so that the data lake may, by using the form of the feature vector, provide "unstructured data" which can be directly used for model reasoning and training support, by which means the data supporting ability of the data lake is improved, and application scenarios are expanded.

Furthermore, on basis of the above-described method for storing data for large model scenarios, the method for storing data for large model scenarios provided in embodiments of the present disclosure is capable of using the target data lake, which stores unstructured data in the form of feature vector, as the data source of the data processing model, which simplifies the configuration requirements of the data processing model and improves the processing capability of the data processing model.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for storing data for a large model scenario, comprising:
   in response to receiving to-be-stored data to be stored into a target data lake, detecting a data type of the to-be-stored data;
   in response to the data type of the to-be-stored data being an unstructured data type, generating a feature vector of the to-be-stored data; and
   storing the feature vector, as a substitute of the to-be-stored data, into the target data lake.

2. The method according to claim 1, wherein in response to successively receiving a plurality pieces of to-be-stored data, the plurality pieces of to-be-stored data are sequentially processed based on a data processing queue, the method further comprises:
   in response to receiving a data providing request from a data source, obtaining a set of initial to-be-stored data provided by the data source;
   ascertaining a set of differential to-be-stored data to be stored into the data processing queue, based on a difference comparison between the set of initial to-be-stored data and a set of to-be-stored data in the data processing queue, wherein differential to-be-stored data in the set of differential to-be-stored data comprises initial to-be-stored data existing in the set of initial to-be-stored data and absent in the set of to-be-stored data in the data processing queue; and
   storing the set of differential to-be-stored data into the data processing queue.

3. The method according to claim 2, further comprising:
   in response to existence of to-be-stored data that has been processed, detecting whether target differential to-be-stored data corresponding to the to-be-stored data that has been processed exists in the set of differential to-be-stored data, wherein the to-be-stored data that has been processed includes historical to-be-stored data of which a feature vector has been generated;
   in response to existence of the target differential to-be-stored data in the set of differential to-be-stored data, deleting the target differential to-be-stored data to obtain an updated set of differential to-be-stored data; and
   the storing the set of differential to-be-stored data into the data processing queue, comprises:
   storing the updated set of differential to-be-stored data into the data processing queue.

4. The method according to claim 1, wherein the generating the feature vector of the to-be-stored data comprises:
   processing the to-be-stored data using a first data processing model, to generate the feature vector of the to-be-stored data.

5. The method according to claim 4, wherein the first data processing model is configured based on a generative language model.

6. The method according to claim 1, further comprises:
   obtaining target input data in response to receiving, from a target device, a request for invoking a second data processing model to process the target input data, wherein the second data processing model is obtained by adjusting a model data source of a first data processing model from local data of the first data processing model to the target data lake;

in response to a data type of the target input data being an unstructured data type, determining whether a target feature vector corresponding to the target input data is able to be extracted from the target data lake;

in response to the target feature vector corresponding to the target input data being able to be extracted from the target data lake, extracting the target feature vector from the target data lake, and using the target feature vector as an actual input to the second data processing model, to generate a target output result corresponding to the target feature vector using the second data processing model; and providing the target output result to the target device.

7. The method according to claim 6, wherein in response to failing to extract the target feature vector corresponding to the target input data from the target data lake, the method further comprises:

marking the target feature vector;

monitoring an update feature vector stored into the target data lake, and detecting whether a target update feature vector corresponding to the target feature vector exists; and in response to existence of the target update feature vector corresponding to the target feature vector, sending first prompt information to the target device, wherein the first prompt information indicates that the target device is allowed to process the target input data using the second data processing model.

8. The method according to claim 7, wherein in response to successively receiving a plurality pieces of to-be-stored data, the plurality pieces of to-be-stored data are sequentially processed based on a data processing queue, the method further comprises:

in response to existence of target to-be-stored data associated with the target input data in the data processing queue, adjusting a data output priority of the target to-be-stored data in the data processing queue to a target priority.

9. The method according to claim 8, further comprising:

in response to absence of the target to-be-stored data associated with the target input data in the data processing queue, sending second prompt information to the target device, wherein the second prompt information indicates that the target device is not allowed to process the target input data using the second data processing model.

10. An apparatus for storing data for a large model scene, comprising:

at least one processor; and a memory, communicating with the at least one processor, wherein the memory stores instructions executable by the at least one processor, and the instructions are executed by the at least one processor, to enable the at least one processor to perform operations, the operations comprising:

in response to receiving to-be-stored data to be stored into a target data lake, detecting a data type of the to-be-stored data;

in response to the data type of the to-be-stored data being an unstructured data type, generating a feature vector of the to-be-stored data; and storing the feature vector, as a substitute of the to-be-stored data, into the target data lake.

11. The apparatus according to claim 10, wherein in response to successively receiving a plurality pieces of to-be-stored data, the plurality pieces of to-be-stored data are sequentially processed based on a data processing queue, the operations further comprise:

in response to receiving a data providing request from a data source, obtaining a set of initial to-be-stored data provided by the data source;

ascertaining a set of differential to-be-stored data to be stored into the data processing queue, based on a difference comparison between the set of initial to-be-stored data and a set of to-be-stored data in the data processing queue, wherein differential to-be-stored data in the set of differential to-be-stored data comprises initial to-be-stored data existing in the set of initial to-be-stored data and absent in the set of to-be-stored data in the data processing queue; and storing the set of differential to-be-stored data into the data processing queue.

12. The apparatus according to claim 11, wherein the operations further comprise:

in response to existence of to-be-stored data that has been processed, detecting whether target differential to-be-stored data corresponding to the to-be-stored data that has been processed exists in the set of differential to-be-stored data, wherein the to-be-stored data that has been processed includes historical to-be-stored data of which a feature vector has been generated;

in response to existence of the target differential to-be-stored data in the set of differential to-be-stored data, deleting the target differential to-be-stored data to obtain an updated set of differential to-be-stored data; and storing the updated set of differential to-be-stored data into the data processing queue.

13. The apparatus according to claim 10, wherein in response to the data type of the to-be-stored data being the unstructured data type, the operations further comprise:

processing the to-be-stored data using a first data processing model, to generate the feature vector of the to-be-stored data.

14. The apparatus according to claim 13, wherein the first data processing model is configured based on a generative language model.

15. The apparatus according to claim 10, wherein the operations further comprise:

obtaining target input data in response to receiving, from a target device, a request for invoking a second data processing model to process the target input data, wherein the second data processing model is obtained by adjusting a model data source of a first data processing model from local data of the first data processing model to the target data lake;

a target feature vector detection unit, configured to: in response to a data type of the target input data being an unstructured data type, determine whether a target feature vector corresponding to the target input data is able to be extracted from the target data lake;

a target feature vector extracting unit, configured to: in response to the target feature vector corresponding to the target input data being able to be extracted from the target data lake, extract the target feature vector from the target data lake, and use the target feature vector as an actual input to the second data processing model, to generate a target output result corresponding to the target feature vector using the second data processing model; and a target result output unit, configured to: provide the target output result to the target device.

16. The apparatus according to claim 15, wherein in response to failing to extract the target feature vector corresponding to the target input data from the target data lake, the operations further comprise:

marking the target feature vector;

monitoring an update feature vector stored into the target data lake, and detecting whether a target update feature vector corresponding to the target feature vector exists; and in response to existence of the target update feature vector corresponding to the target feature vector, sending first prompt information to the target device, wherein the first prompt information indicates that the target device is allowed to process the target input data using the second data processing model.

17. The apparatus according to claim 16, wherein in response to successively receiving a plurality pieces of to-be-stored data, the plurality pieces of to-be-stored data are sequentially processed based on a data processing queue, the operations further comprise:

in response to existence of target to-be-stored data associated with the target input data in the data processing queue, adjusting a data output priority of the target to-be-stored data in the data processing queue to a target priority.

18. The apparatus according to claim 17, wherein the operations further comprise:

in response to absence of the target to-be-stored data associated with the target input data in the data processing queue, sending second prompt information to the target device, wherein the second prompt information indicates that the target device is not allowed to process the target input data using the second data processing model.

19. A non-transitory computer-readable storage medium, storing computer instructions which, when executed by a computer, cause the computer to perform operations, the operations comprising:

in response to receiving to-be-stored data to be stored into a target data lake, detecting a data type of the to-be-stored data;

in response to the data type of the to-be-stored data being an unstructured data type, generating a feature vector of the to-be-stored data; and storing the feature vector, as a substitute of the to-be-stored data, into the target data lake.

20. The non-transitory computer-readable storage medium according to claim 19, wherein the operations further comprise:

obtaining target input data in response to receiving, from a target device, a request for invoking a second data processing model to process the target input data, wherein the second data processing model is obtained by adjusting a model data source of a first data processing model from local data of the first data processing model to the target data lake;

in response to a data type of the target input data being an unstructured data type, determining whether a target feature vector corresponding to the target input data is able to be extracted from the target data lake;

in response to the target feature vector corresponding to the target input data being able to be extracted from the target data lake, extracting the target feature vector from the target data lake, and using the target feature vector as an actual input to the second data processing model, to generate a target output result corresponding to the target feature vector using the second data processing model; and providing the target output result to the target device.

* * * * *